US005606118A

United States Patent [19]

Muth et al.

[11] Patent Number: 5,606,118

[45] Date of Patent: Feb. 25, 1997

[54] SYSTEM AND METHOD FOR DETECTING MISFIRE IN AN INTERNAL COMBUSTION ENGINE

[75] Inventors: Michael J. Muth, Grosse Ile; John W. Piatak, Livonia, both of Mich.

[73] Assignee: Ford Motor Company, Dearborn, Mich.

[21] Appl. No.: 523,205

[22] Filed: Sep. 5, 1995

[51] Int. Cl.[6] .................................................. G01M 15/00

[52] U.S. Cl. .......................... 73/116; 73/35.01; 123/425; 324/380; 324/402

[58] Field of Search .................................. 73/116, 117.2, 73/117.3, 35.01, 35.07; 324/380, 384, 402; 123/419, 425, 436; 364/431.03, 431.05, 431.08

[56] References Cited

U.S. PATENT DOCUMENTS

| | | | |
|---|---|---|---|
| 4,684,896 | 8/1987 | Weishaupt | 324/380 |
| 4,886,029 | 12/1989 | Lill et al. | 324/380 |
| 4,918,389 | 4/1990 | Schleupen et al. | 324/399 |
| 5,019,779 | 5/1991 | Ookawa | 324/388 |
| 5,027,073 | 6/1991 | Kaller et al. | 324/388 |
| 5,046,470 | 9/1991 | Entenmann et al. | 123/481 |
| 5,215,067 | 6/1993 | Shimasaki et al. | 324/399 |
| 5,237,278 | 8/1993 | Bumen | 324/402 |
| 5,269,282 | 12/1993 | Miyata et al. | 73/116 |
| 5,347,855 | 9/1994 | Miyata et al. | 73/116 |
| 5,349,299 | 9/1994 | Kanehiro et al. | 324/380 |
| 5,388,560 | 2/1995 | Hisaki et al. | 123/425 |

*Primary Examiner*—Richard Chilcot
*Assistant Examiner*—George M. Dombroske
*Attorney, Agent, or Firm*—Paul K. Godwin

[57] ABSTRACT

A system and method for accurately detecting misfires in an internal combustion engine which includes an ignition coil 12 with a primary winding 22 and a secondary winding 30, at least one spark plug 62, and an ignition controller 20 responsive to engine operating conditions for generating an ignition signal. Preferably, the ignition coil generates sparking voltage for firing the spark plug in response to the ignition signal. Sparking voltage and firing of an ignition spark are detected (steps 402–410). An average sparking voltage after the firing of the ignition spark and a peak sparking voltage after the firing of the ignition spark are determined (steps 412–420). And, an indication of misfire in response to the average sparking voltage and the peak sparking voltage is provided (steps 422–428).

11 Claims, 4 Drawing Sheets

10
12
14
16
18
20
22
24
26
28
30
32
34
36
38
40
42
44
46
48
50
52
54
56
58
60
62
64
66
68
72
74
76
78
80
82
84
86
88
$V_{BAT}$
Signal Conditioning
Controller
CA
TP
ACT
ECT

SYSTEM AND METHOD FOR DETECTING MISFIRE IN AN INTERNAL COMBUSTION ENGINE

BACKGROUND OF THE INVENTION

This invention relates generally to detecting misfire in internal combustion engines, and more particularly to detecting misfires attributable to a cause in the fuel supply system.

In spark-ignition internal combustion engines, the spark plug in conjunction with other ignition system components generates a discharge arc across the spark gap from one electrode to another. The challenge is to discharge the firing spark at just the precise moment and under the right conditions to ensure ignition of the air-fuel mixture introduced into the combustion chamber. When the air-fuel mixture does not ignite, for whatever reason, a "misfire" has occurred.

Misfires are generally attributable to a failure in either the ignition system or fuel supply system. In misfires attributable to the ignition system, the problem is usually a failure to generate the required firing spark which may be caused, for example, by a fouled spark plug. Misfires attributable to fuel system failures typically are associated with a problem in supplying the proper air-fuel mixture to the combustion chamber. Regardless of the cause, the effects of misfiring are typically the same: increased fuel consumption, degraded engine performance, and inefficiencies in the catalytic converter which may result in increased emissions. Accordingly, it is desirable to detect misfires in order to make adjustments to minimize their occurrence.

Several prior art approaches are known for detecting misfires attributable to a cause in the fuel supply system. U.S. Pat. No. 5,215,067 teaches a system for detecting misfires attributable to a cause in the fuel system. In one embodiment, the system monitors the primary coil discharge voltage during a predetermined time period. The system then calculates a value proportional to the area in which the sensed voltage exceeds a reference value. This value is then compared with a threshold value. In one embodiment when the former exceeds the latter, a misfire is immediately determined to have occurred. In another embodiment, the system repeatedly carries out the above procedure until the predetermined time period elapses at which point the comparison to the threshold value is made to determine the occurrence of a misfire.

The inventors herein have recognized several problems and disadvantages with the approach taught in U.S. Pat. No. 5,215,067 and other time based methods and systems. For example, the duration and magnitude of the firing spark is highly dependent upon engine operating conditions such as temperature and engine load. Accordingly, in order to ensure accurate detection of misfire across a broad spectrum of engine operating conditions, significant empirical study must be performed to determine the appropriate time periods and threshold values for comparison purposes. Moreover, more memory may be required to store these reference values in a look-up table for future use.

Another disadvantage associated with the approach taught in U.S. Pat. No. 5,215,067 is that in order to derive a value proportional to the area in which the sensed voltage exceeds a reference value during the initial capacitive discharge state may require a very fast sampling rate. Accordingly, there may be a trade-off between sampling rate and system accuracy.

SUMMARY OF THE INVENTION

An object of the invention herein is to provide for the accurate detection of misfires in an internal combustion engine which is less sensitive to engine operating conditions.

The above object is achieved, and problems of prior approaches overcome, by providing both a system and a method for accurately detecting misfires in an internal combustion engine which includes an ignition coil with a primary winding and a secondary winding, at least one spark plug, and ignition control means responsive to engine operating conditions for generating an ignition signal. Preferably, the ignition coil generates sparking voltage for firing the spark plug in response to the ignition signal.

In one aspect of the invention, the ignition system including misfire detection for an internal combustion engine comprises: an ignition coil having a primary winding and a secondary winding; at least one spark plug coupled to the secondary winding; an ignition controller coupled to the ignition coil for controlling generation of a sparking voltage. Advantageously, the ignition system further includes voltage sensing means for sensing sparking voltage; spark detection means responsive to the voltage sensing means for detecting firing of an ignition spark; averaging means responsive to the voltage sensing means and the spark detection means for deriving an average sparking voltage after firing of the ignition spark; peak determining means responsive to the voltage sensing means for determining a peak sparking voltage after firing of the ignition spark; and misfire indicating means responsive to the averaging means and the peak voltage means for providing an indication of misfire.

In another aspect of the invention, the method includes the steps of: sensing sparking voltage; detecting firing of an ignition spark; determining an average sparking voltage after the firing of the ignition spark; determining a peak sparking voltage after the firing of the ignition spark; and indicating misfire in response to the average sparking voltage and the peak sparking voltage.

An advantage of the above aspects of the invention is that the detection of misfires is accurately provided regardless of engine operating conditions such as temperature and engine load.

BRIEF DESCRIPTION OF THE DRAWINGS

The above object and advantages of the invention will be more clearly understood by reading examples of embodiments in which the invention is used to advantage with reference to the attached drawings wherein like numerals refer to like parts and wherein.

DETAILED DESCRIPTION OF A PREFERRED EMBODIMENT

Before describing the present invention in the context of a preferred embodiment, it is important to understand that the present invention may in fact be used to detect misfires in any spark-ignited internal combustion engine which uses an ignition coil to generate the energy necessary to discharge the spark plug. However, to facilitate understanding, the present invention will be described in the context of a distributorless ignition system.

Figure 1:
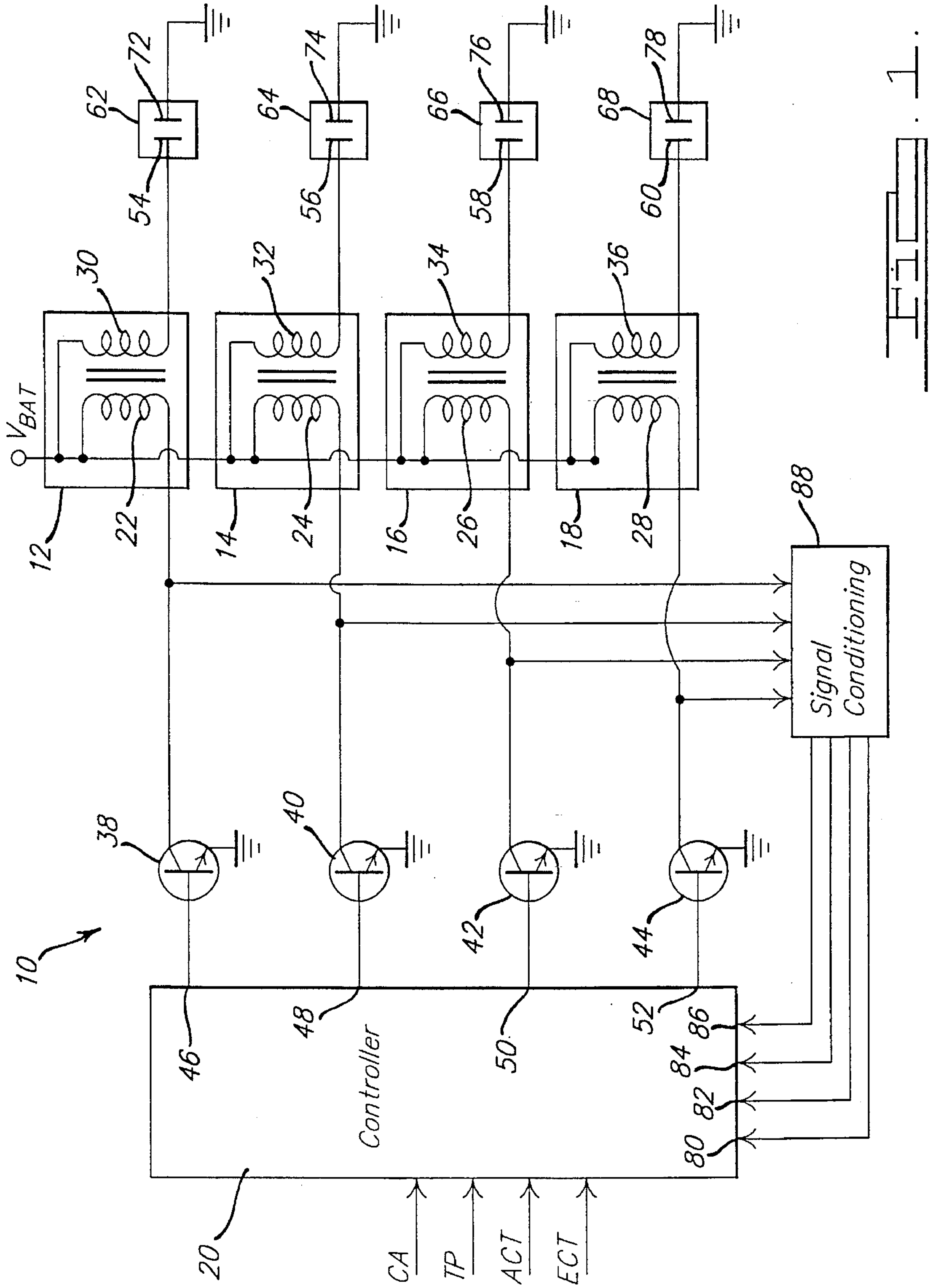
FIG. 1 is a block diagram of a system in which the invention is used to advantage.

In FIG. 1, distributorless ignition system 10 is shown including ignition coils 12, 14, 16, and 18 each responsive to controller 20 for effecting combustion of the air-fuel mixture introduced into respective cylinders of a four-cylinder internal combustion engine (not shown). Ignition coils 12, 14, 16 and 18 each include respective primary windings 22, 24, 26 and 28 which are magnetically coupled to respective secondary windings 30, 32, 34, and 36. Each primary winding 22, 24, 26 and 28 is coupled between voltage source $V_{bat}$, supplied by a conventional vehicle battery (not shown) and ground via electronically controlled switches, such as power transistors 38, 40, 42 and 44, which are coupled to output ports 46, 48, 50 and 52 of controller 20. Each secondary winding 30, 32, 34, and 36 is coupled between voltage source $V_{bat}$ and respective center electrodes 54, 56, 58 and 60 of spark plugs 62, 64, 66 and 68. Side electrodes 72, 74, 76 and 78 each connect to ground. Preferably, ignition coils 22, 24, 26 and 28 are mounted directly on spark plugs 62, 64, 66 and 68 (so called "coil on plug" spark plugs)

Continuing with FIG. 1, controller 20 determines timing for generating the high voltage spark at the appropriate spark plug and controlling power transistors 38, 40, 42 and 44 by conventionally processing stored reference information such an engine size, along with sensed engine conditions such as crankshaft angle (CA), engine coolant temp (ECT), air charge temperature (ACT), and throttle position (TP).

Having described the interconnections of the various components of distributorless ignition system 10, the generation of the high voltage spark necessary to ignite the air-fuel mixture will now be described. Since the ignition spark is generated at each spark plug in a similar fashion, only the generation of spark across the electrodes of spark plug 62 will be described herein.

Figure 2:
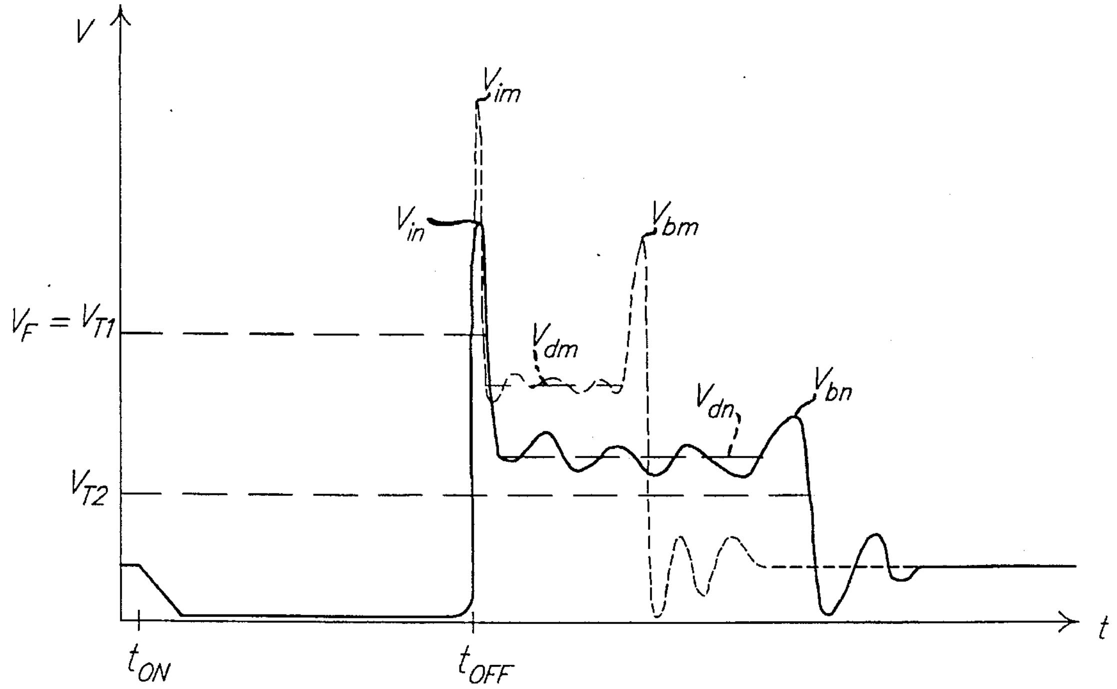
FIGS. 2 and 3 are graphical illustrations of the voltage induced in the primary winding and secondary winding, respectively, as a function of time.
Figure 3:
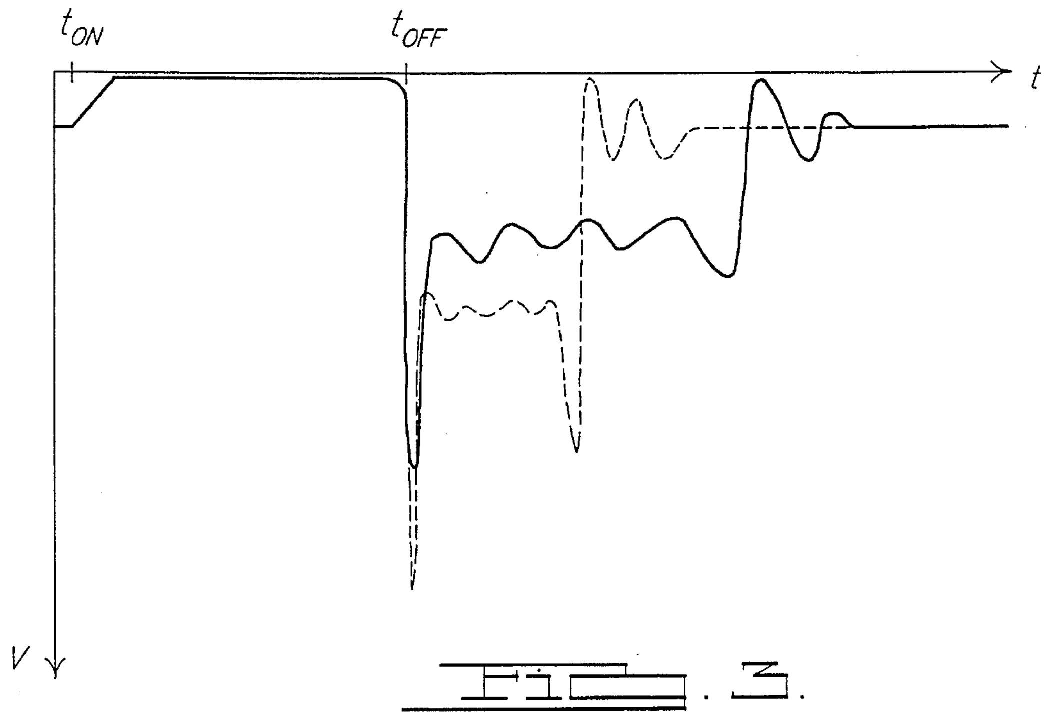

FIGS. 2 and 3 graphically illustrate sparking voltage induced in primary winding 22 and secondary winding 30, respectively, under both normal firing (solid line) and misfiring (dashed line) conditions. The normal firing condition will be described first.

First, it is assumed that controller 20 has determined in a conventional manner that spark plug 62 is next in the firing order. At the appropriate time, $t_{ON}$, controller 20 switches power transistor 28 ON to complete the primary circuit. At that point, current begins to flow in primary winding 22 and electrical energy drawn into ignition coil 12 from the vehicle battery is stored in the expanding magnetic field of ignition coil 12. Once the primary circuit reaches its current limiting area (approximate 5–6.5 amps), the magnetic field in ignition coil 12 stabilizes and no additional energy is stored. Accordingly, the voltage in primary winding 22 plateaus at dwell voltage value $V_{dwell}$ close to ground potential. Preferably controller 20 accounts for the time required for the primary circuit to reach its current limiting area in calculating dwell timing for advancing or retarding ignition timing.

At the expiration of the dwell time, $t_{off}$, controller 20 turns power transistor 38 OFF to open the primary circuit. A rapidly rising voltage induced in secondary winding 30 by the rapidly collapsing magnetic field is reflected back on primary winding 22. The magnitude of the voltage induced in secondary winding 30 obviously depends on the turns ratio of the primary and secondary windings. For a typical automotive ignition coil, this ratio is approximately 1:100 in order to generate the required spark ignition voltage at the spark plug (upwards of 30 to 40 kilovolts). Accordingly, ignition coil 12 essentially operates as a voltage step-up transformer.

Continuing with FIG. 2, the magnitude of the sparking voltage continues to rise until spark ignition voltage $V_{in}$ is reached. At ignition voltage $V_{in}$ a spark is fired across the gap of spark plug 62 from center electrode 54 to side electrode 72. Just after the spark is fired, the sparking voltage drops to a discharge voltage level which centers about an average discharge value $V_{dn}$ for the duration of the firing spark. In the case of normal firing, it is in this stage of firing that the air-fuel mixture is ignited by the spark.

Towards the end of the spark discharge, the sparking voltage again rises as discharging ignition coil 12 can no longer sustain the arc across the electrodes. The voltage level at which the firing spark extinguishes is breakdown voltage $V_{bn}$. After spark breakdown, the sparking voltage decays to supply voltage $V_{bat}$.

In the case of misfiring, the characteristic of the sparking voltage induced on primary winding 22 follows the same general pattern as was just described above in the case of normal firing (see FIG. 3 for secondary winding 30). As shown in FIG. 2, however, the misfire case is distinguishable from the normal firing case in that the ignition voltage $V_{im}$, average discharge voltage $V_{dm}$, and the breakdown voltage $V_{bm}$ are each of greater magnitudes when a misfire takes place. Additionally, the spark duration is typically shorter when a misfire occurs.

The present invention allows controller 20 to distinguish between the normal firing and misfiring cases so that appropriate adjustments can be made in the ignition strategy when misfiring is occurring. An advantage is thereby obtained of minimizing the occurrence of misfires and its effects on engine performance.

To accomplish this task in the presently described embodiment, each primary winding 22, 24, 26 and 28 couples to respective A/D inputs 80, 82, 84 and 86 of controller 20. Conventional signal conditioning circuitry 88 is advantageously interposed therebetween to attenuate the primary voltage signal to a level which is within the A/D input range of controller 20. While the present discussion is in the context of coupling controller 20 to primary windings 22, 24, 26 and 28, one skilled in the art will recognize that the present invention could be easily modified to operate off secondary windings 30, 32, 34 & 36 as well.

Figure 4:
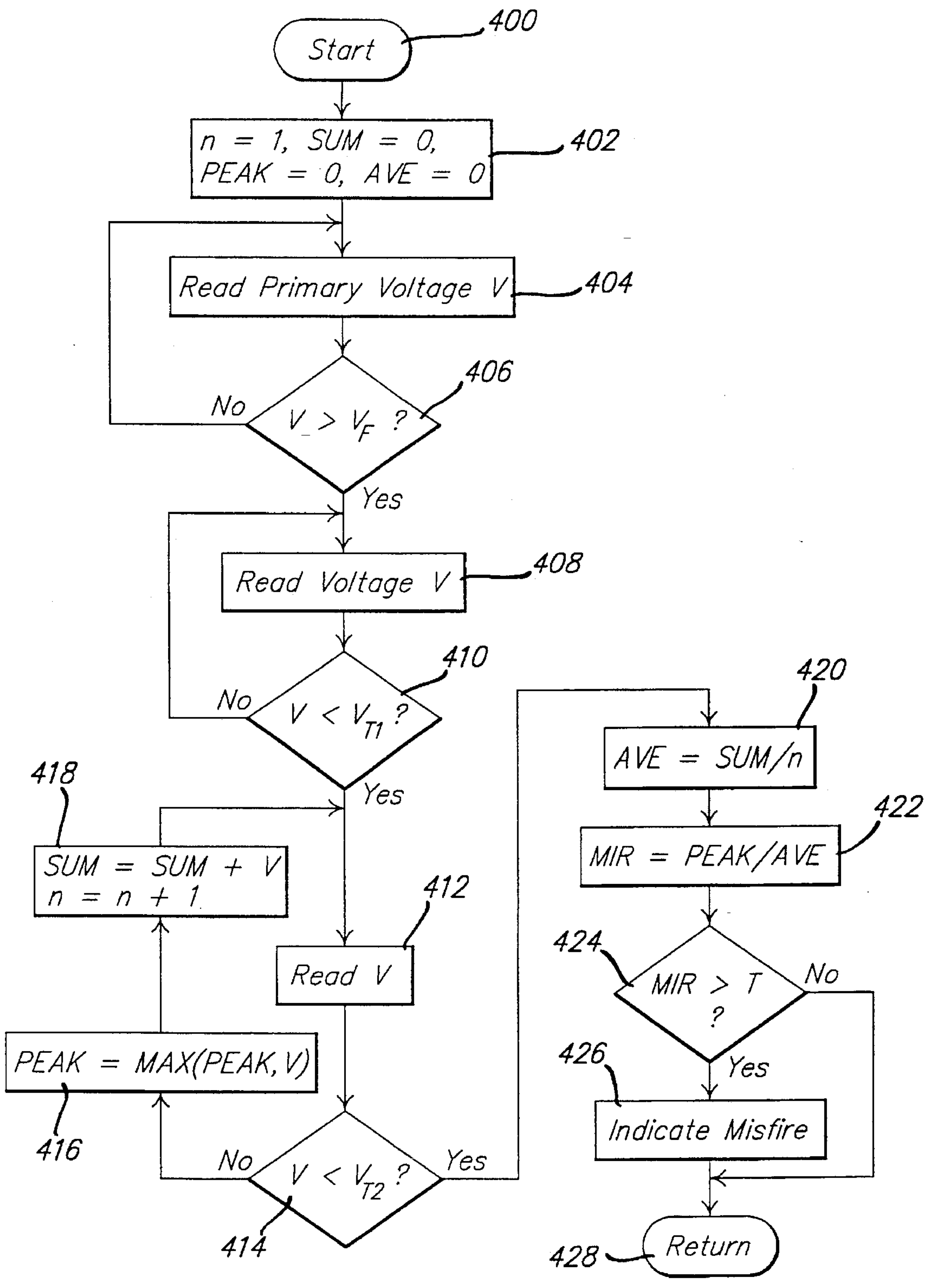
FIG. 4 is a flowchart illustrating various process steps performed in one embodiment of the invention.

Turning to FIG. 4, the operation of controller 20 in detecting misfires will now be described. Preferably, the operations performed by controller 20 are synchronized with the control of output drivers 38, 40, 42 and 44 to ensure that controller 20 is reading the voltage associated with the appropriate primary winding during the time when spark is expected to be generated.

At the synchronized start, controller 20 initializes various values (steps 400 and 402). After controller 20 reads primary voltage V in step 404, controller 20 determines whether firing has been initiated by comparing primary voltage V against a predetermined threshold value $V_F$ (step 406). Threshold value $V_F$ is set to a level above the dwell voltage $V_{dwell}$ of the primary circuit and below the expected ignition voltage for normal firing $V_{in}$ (see FIG. 2). Controller 20 continues to read primary voltage V until threshold value $V_F$ is exceeded. One skilled in the art will appreciate that a timer could be started when the primary circuit is opened again at $t_{off}$ such that should threshold value $V_F$ not be exceeded within a specified amount of time, controller 20 indicates that a firing spark was not generated and therefore a fault may exist in the ignition circuitry associated with that cylinder.

Once the threshold value $V_F$ is exceeded, controller 20 continues to read primary voltage V (step 408) until the value drops below a second threshold. $V_{T1}$ (step 410) which is preferably set above the average discharge voltage $V_{dn}$ (see FIG. 2). The passing of both thresholds ensures that the spark has fired and allows controller 20 to determine the start of the spark discharge phase. In the present embodiment, both thresholds are set to the same value for convenience.

Once the initial voltage spike is passed, controller 20 samples primary voltage V at regular intervals, every five microseconds in this example, until primary voltage V drops below a third threshold value $V_{T2}$ (steps 412 and 414). Threshold value $V_{T2}$ is set below the expected normal firing average discharge voltage $V_{dn}$ (see FIG. 2). During the sampling period, controller 20 determines a peak discharge voltage (PEAK), calculates a sum of the sample voltage values (SUM), and maintains a count (n) of the number of samples (steps 416–418).

After the primary voltage drops below voltage threshold $V_{T2}$ (step 414), controller 20 calculates an actual average discharge voltage AVE in step 420 by dividing the sum by the number of samples (SUM/n). A misfire indicating ratio MIR is calculated in step 422 by dividing the peak discharge voltage PEAK by the average discharge voltage AVE. When the calculated ratio MIR exceeds a predetermined misfire indicating ratio threshold T (step 424), then controller 20 determines that a misfire has occurred and preferably returns to adjust ignition control strategy appropriately (steps 426 and 428). Alternately, when the calculated misfire indicating ratio MIR does not exceed the predetermined misfire ratio threshold T at step 424, normal firing has occurred and controller 20 may return and continue according to its normal operating strategy (step 428).

Figure 5:
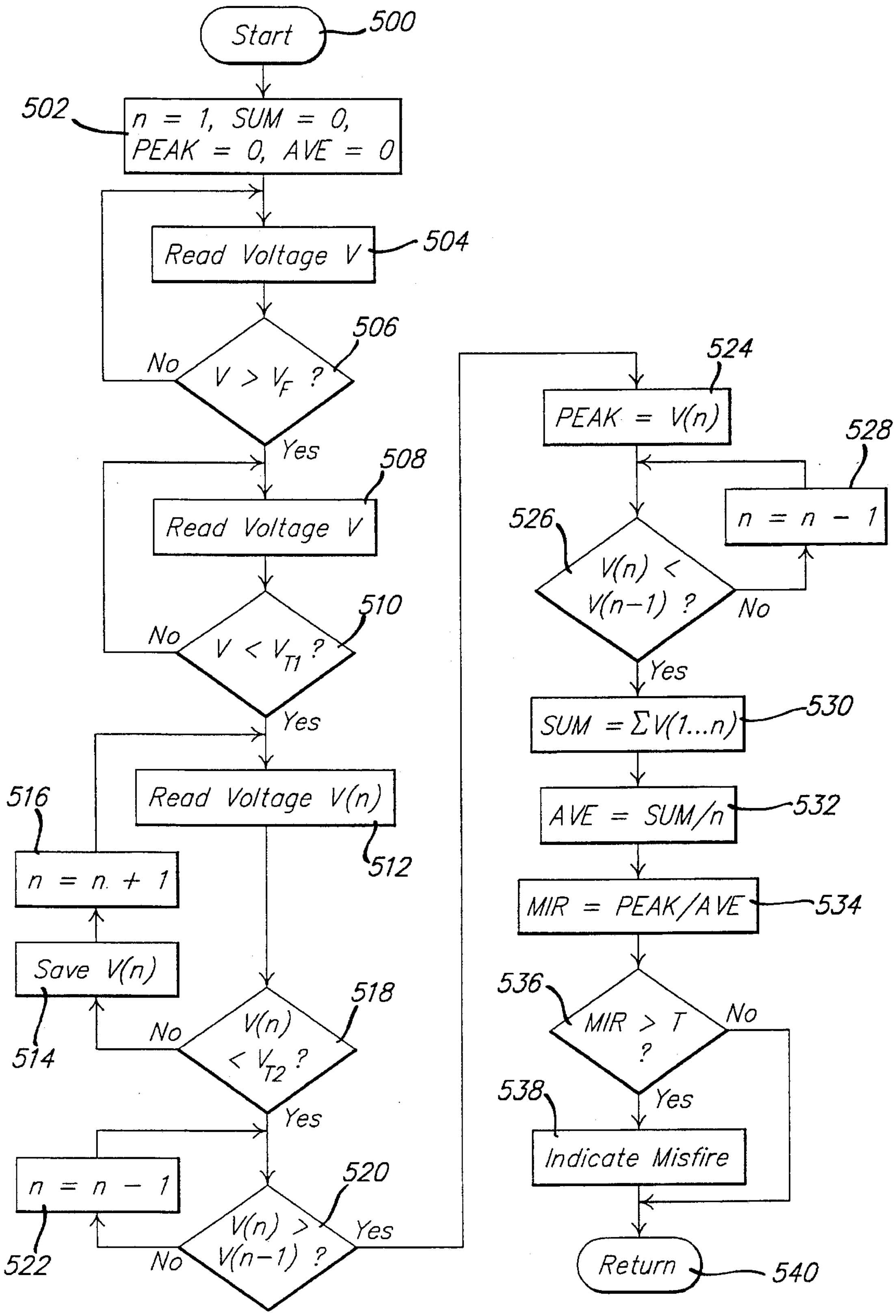
FIG. 5 is a flowchart illustrating various process steps performed in an alternative embodiment of the invention.

An alternative embodiment of the operation of controller 20 is shown in FIG. 5. Similar to steps 400–412, controller 20 first initializes the variables and then triggers off of the initial voltage spike of the firing spark to determine when to begin sampling primary voltage V (steps 500–512). Obviously many alternative means could be used in either method to detect the initial voltage spike generated by the firing spark without departing from the spirit and scope of the present invention. For example, controller 20 could calculate a slope based on the voltage change over time and compare these values against predetermined values to determine if the spike has been generated. Alternatively, controller 20 could wait a predetermined amount of time after the ignition command at $t_{OFF}$ to begin sampling.

Continuing with FIG. 5, controller 20 stores each sample value in a memory (step 514) and maintains a count of the number of samples taken (step 516) until primary voltage V drops below a threshold voltage $V_{T2}$ which is similar to the threshold voltage $V_{T2}$ used in step 414 (step 518). However, after it has been determined in step 518 that spark breakdown has occurred, controller 20 begins comparing each voltage sample V(n) against the previous voltage sample V(n−1) until the final voltage peak PEAK (i.e., breakdown voltage $V_b$ in FIG. 2) is derived (steps 520–524).

Preferably, after the final peak voltage PEAK is determined in step 524, controller 20 continues to compare each voltage sample V(n) against the previous voltage sample V(n−1) until the final valley in the primary voltage characteristic prior to spark breakdown is detected (step 526 and 528). Controller 20 then calculates the actual average discharge voltage AVE (see $V_d$ in FIG. 2) by summing sample voltage values 1 through n and dividing the sum by the number of samples (SUM/n). Once average discharge voltage AVE is determined, controller 20 determines misfire indicating ratio MIR and indicates whether a misfire has occurred in a manner similar to steps 422–428 (steps 534–540).

An advantage of the embodiment as described above, is that both utilize a misfire indicating ratio to determine the occurrence of a misfire attributable to a cause in the fuel supply system. The ratio metric nature of the present invention makes the misfire detections less sensitive to varying engine operating conditions and single parameter calculations or time dependent detection systems.

Another advantage of the presently described embodiments is that it is not necessary to capture the initial firing or ignition voltage value (see $V_i$ in FIG. 2). Rather, controller 20 ignores this portion of the sparking voltage characteristic and determines the occurrence of the misfire from analyzing the remaining portions of that characteristic, i.e., just after spark ignition through spark breakdown. Accordingly, controller 20 may operate at a slower sampling rate.

In the alternative embodiments described above, the inventors herein have also recognized that the sensitivity of misfire indicating ratio MIR can be improved by further separating regions of the voltage characteristic between the spark discharge region and the spark breakdown region. A tradeoff, however, may be required with respect to real time implementation. For example, in the embodiment shown in FIG. 3, both the region used to determine the average voltage value AVE and the region used to determine the peak voltage value PEAK completely overlap. While this method may decrease the sensitivity of misfire indicating ratio MIR, one skilled in the art will recognize that real time implementation is easier than when separating the two regions as is done in the alternative method shown in FIG. 4. Additionally, fewer memory addresses are required in the embodiment of FIG. 3.

Obviously, the reading of the above description by those skilled in the art will bring to mind many alterations and modifications which can be applied to the presently described embodiments without departing from the spirit and scope of the claimed invention. For example, the steps performed by controller 20 in the present invention may be accomplished using any number of combinations of digital and analog devices commonly known in the art. For example, averaging may be accomplished by using analog filters and peaks can be determined using comparators or peak hold circuits. Alternatively, a microcomputer could be utilized.

It is also important to note that the present invention is not limited to monitoring the sparking voltage induced on the primary voltage. Rather, controller 20 may be coupled to any point in the ignition system where the sparking voltage characteristic is readable. For example, controller 20 could be coupled to the secondary windings or at the spark plugs with appropriate modifications to the threshold values and the attenuation circuitry to account for the inverted sparking voltage characteristic and increased magnitudes (compare FIGS. 2 and 3).

Similarly, while the invention has been described in the context of a four-cylinder electronic distributorless ignition system, one skilled in the art will surely appreciate the present invention's application for detecting misfires in any number of spark ignition system configurations suitable for spark-ignited internal combustion engines. Accordingly, it is intended that the invention be limited to only the following claims.

What is claimed:

1. A method for detecting misfire in an internal combustion engine having an ignition system including an ignition coil with a primary winding and a secondary winding, at least one spark plug, and ignition control means responsive to engine operating conditions for generating an ignition signal, the ignition coil generating sparking voltage for firing the spark plug in response to the ignition signal; the method comprising the steps of:

sensing sparking voltage;

detecting firing of an ignition spark;

after detecting said firing of said ignition spark, determining an average sparking voltage by comparing said sparking voltage against a first predetermined threshold to determine when to begin sampling said sparking voltage, sampling said sparking voltage to obtain a number of sample sparking voltage values, comparing said sparking voltage against a second predetermined threshold to determine when to end said sampling, and deriving said average sparking voltage by dividing a sum of said sample sparking voltage values by said number;

determining a peak sparking voltage after said firing of said ignition spark; and indicating misfire in response to said average sparking voltage and said peak sparking voltage.

2. A method according to claim 1 wherein said sparking voltage is sensed at the primary winding of the ignition coil.

3. A method according to claim 1 wherein said step of detecting firing of an ignition spark includes the step of determining when said sparking voltage exceeds a predetermined threshold.

4. A method according to claim 1 wherein said step of determining a peak sparking voltage includes the step of determining a maximum value among said sample sparking voltage values.

5. A method according to claim 1 wherein said step of indicating misfire in response to said average sparking voltage and said peak sparking voltage includes the steps of deriving a misfire indicating ratio from said peak sparking voltage and said average sparking voltage, and comparing said ratio to a predetermined value.

6. A method for detecting misfire in an internal combustion engine having an ignition system including an ignition coil with a primary winding and a secondary winding, at least one spark plug, and ignition control means responsive to engine operating conditions For generating an ignition signal, the ignition coil generating sparking voltage for firing the spark plug in response to the ignition signal; the method comprising the steps of:

monitoring sparking voltage;

detecting firing off an ignition spark;

determining an average sparking voltage value of said sparking voltage between said firing of said ignition spark and breakdown of said ignition spark;

determining a peak sparking voltage at said breakdown of said ignition spark;

providing an indication of misfire in response to said average sparking voltage and said peak sparking voltage.

7. A method according to claim 6 wherein said sparking voltage is monitored at the primary winding of the ignition coil.

8. A method according to claim 6 wherein said step of detecting firing of an ignition spark includes the steps of comparing said sparking voltage with a predetermined firing threshold.

9. A method according to claim 8 wherein said step of determining an average sparking voltage after firing of an ignition spark includes the steps of sampling said sparking voltage at predetermined intervals to obtain a number of sample sparking voltage values; and dividing a sum of said sample sparking voltage values by said number.

10. A method according to claim 9 further comprising the step of storing said sample sparking voltage values and wherein said step of determining a peak sparking voltage at breakdown of said spark includes the steps of determining when said sparking voltage passes a predetermined breakdown threshold, comparing a current sample sparking voltage value to a next previous sample sparking voltage value until said next previous sample sparking voltage value is less in magnitude than said current sample sparking voltage value; and setting said peak voltage value equal to said current sample voltage value.

11. A method according to claim 6 wherein said step of providing an indication of misfire in response to said average sparking voltage and said peak sparking voltage includes the steps of deriving a misfire indicating ratio from said peak sparking voltage and said average sparking voltage, and comparing said misfire indicating ratio to a predetermined value.

* * * * *